United States Patent
Cai et al.

(10) Patent No.: US 12,105,747 B2
(45) Date of Patent: Oct. 1, 2024

(54) AUTOMATIC CONTENT GENERATION

(71) Applicant: Microsoft Technology Licensing, LLC, Redmond, WA (US)

(72) Inventors: Weixin Cai, Bothell, WA (US); Si-Qing Chen, Bellevue, WA (US); Michel Galley, Seattle, WA (US); William Brennan Dolan, Kirkland, WA (US); Christopher J. Brockett, Kirkland, WA (US); Zhang Li, Bellevue, WA (US); Warren A. Aldred, Redmond, WA (US); Xinyu He, Lynnwood, WA (US); Jesse Alexander Freitas, Seattle, WA (US); Kaushik Ramaiah Narayanan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/836,456

(22) Filed: Jun. 9, 2022

(65) Prior Publication Data

US 2023/0385320 A1 Nov. 30, 2023

Related U.S. Application Data

(60) Provisional application No. 63/347,004, filed on May 30, 2022.

(51) Int. Cl.
*G06F 16/338* (2019.01)
*G06F 16/332* (2019.01)
(Continued)

(52) U.S. Cl.
CPC ........ *G06F 16/338* (2019.01); *G06F 16/3326* (2019.01); *G06F 16/335* (2019.01);
(Continued)

(58) Field of Classification Search
CPC .. G06F 16/338; G06F 16/3326; G06F 16/335; G06F 18/22; G06F 40/253; G06F 40/30; G06N 20/00
See application file for complete search history.

(56) References Cited

U.S. PATENT DOCUMENTS

2012/0297294 A1 11/2012 Scott et al.
2021/0271823 A1* 9/2021 De Ridder ............. G06N 5/022

FOREIGN PATENT DOCUMENTS

WO 2010105265 A2 9/2010

OTHER PUBLICATIONS

Multiversal views on language models (Year: 2021).*
(Continued)

*Primary Examiner* — Mark D Featherstone
*Assistant Examiner* — Samuel C Sharpless, III
(74) *Attorney, Agent, or Firm* — Schwegman Lundberg & Woessner, P.A.

(57) ABSTRACT

Systems and methods are directed to generating content that is contextually relevant in a writing style of a user. In example embodiments, a plurality of logical inputs regarding a topic is received in bullet point format. A content generator generates draft content using machine learning (ML) models. The generating comprises identifying a writing style of the user by applying the plurality of logical inputs to a first ML model, determining a context and direction for the draft content using a second ML model, and based on the plurality of logical inputs, the identified writing style, and the context and direction, generating at least one paragraph of draft content in the writing style of the user that follows an outline associated with the bullet point format and comprises a same context and direction as the plurality of logical inputs. The draft content is then presented at a client device.

20 Claims, 12 Drawing Sheets

(51) Int. Cl.
*G06F 16/335* (2019.01)
*G06F 18/22* (2023.01)
*G06F 40/253* (2020.01)
*G06F 40/30* (2020.01)
*G06N 20/00* (2019.01)

(52) U.S. Cl.
CPC ............ *G06F 18/22* (2023.01); *G06F 40/253* (2020.01); *G06F 40/30* (2020.01); *G06N 20/00* (2019.01)

(56) References Cited

OTHER PUBLICATIONS

"International Search Report and Written Opinion Issued in PCT Application No. PCT/US2023/018250", Mailed Date: Jul. 10, 2023, 09 Pages.

\* cited by examiner

Word Processing

Search (Option + Q)

Font Type

Editor Inspiration

Previewing content generated from your outline:

730

Global warming is an important issue of discussion. The Earth's temperature has been rising in the past ten years, according to scientists at the University of California, Los Angeles. The main cause of global warming is human activities and carbon dioxide emission. The glaciers are melting in a faster speed and are threatening the life of animals like polar bears and penguins. There are also more and more large scale wild fires, such as the wild fires in Australia in 2020. "We need to be careful not to underestimate the impact of client change," said Dr. David McKinnon, director of the Center for Climate Change Research at the University of New York. "It's very important that we take into account the impacts of climate change on the environment." (McKinnon, 2018). In addition to the increasing number of people living in extreme heat, there are also growing numbers of people who live in extreme heat, such as those who live in extreme temperatures. "The problem with climate change is that it's going to happen oven time, but it's happening every day," McKinnon said. "There are many things that can be done to reduce the effects of client change. It's really important that we look at the 732 — Add to my document    Back — 734

710

Editor

Editor
Refinements
| Clarity | ○ |
| Concisement | ○ |
| Formality | ○ |
| Inclusiveness | ○ |
| Perspectives | ○ |
| Punctuation Conventions | ○ |
| Sensitive Terms | ○ |
| Acronyms | ○ |

Page 1 of 1    322 words    Time to Read: 2 min    English (U.S.)    Text Prediction: On    General

AUTOMATIC CONTENT GENERATION

CROSS REFERENCE TO RELATED APPLICATIONS

This application claims priority to U.S. Provisional Patent Application No. 63/347,004, filed May 30, 2022, and entitled "Automatic Content Generation." The contents of this prior application are considered part of this application and are hereby incorporated by reference in its entirety.

TECHNICAL FIELD

The subject matter disclosed herein generally relates to artificial intelligence assisted writing. Specifically, the present disclosure addresses systems and methods that automatically generate content in a context and writing style of a user using a flexible artificial intelligent writing assistant.

BACKGROUND

Oftentimes, a user may get writer's block and cannot fluently compose content that reflects what the user wants to convey. Unfortunately, conventional content generation systems are limited in their capabilities. Typically, these conventional systems only allow a user to provide a few keyworks or a few phrases to generate content (e.g., a paragraph). As a result, these conventional systems do not take context into consideration resulting in generated content that may only be marginally relevant to a user's original intent and that may not be in a style of the user.

BRIEF DESCRIPTION OF THE DRAWINGS

Some embodiments are illustrated by way of example and not limitation in the figures of the accompanying drawings.

FIG. 7A to FIG. 7E are example screenshots illustrating user interfaces used for automatic content generation displayed at the client device.

DETAILED DESCRIPTION

Figure 1:
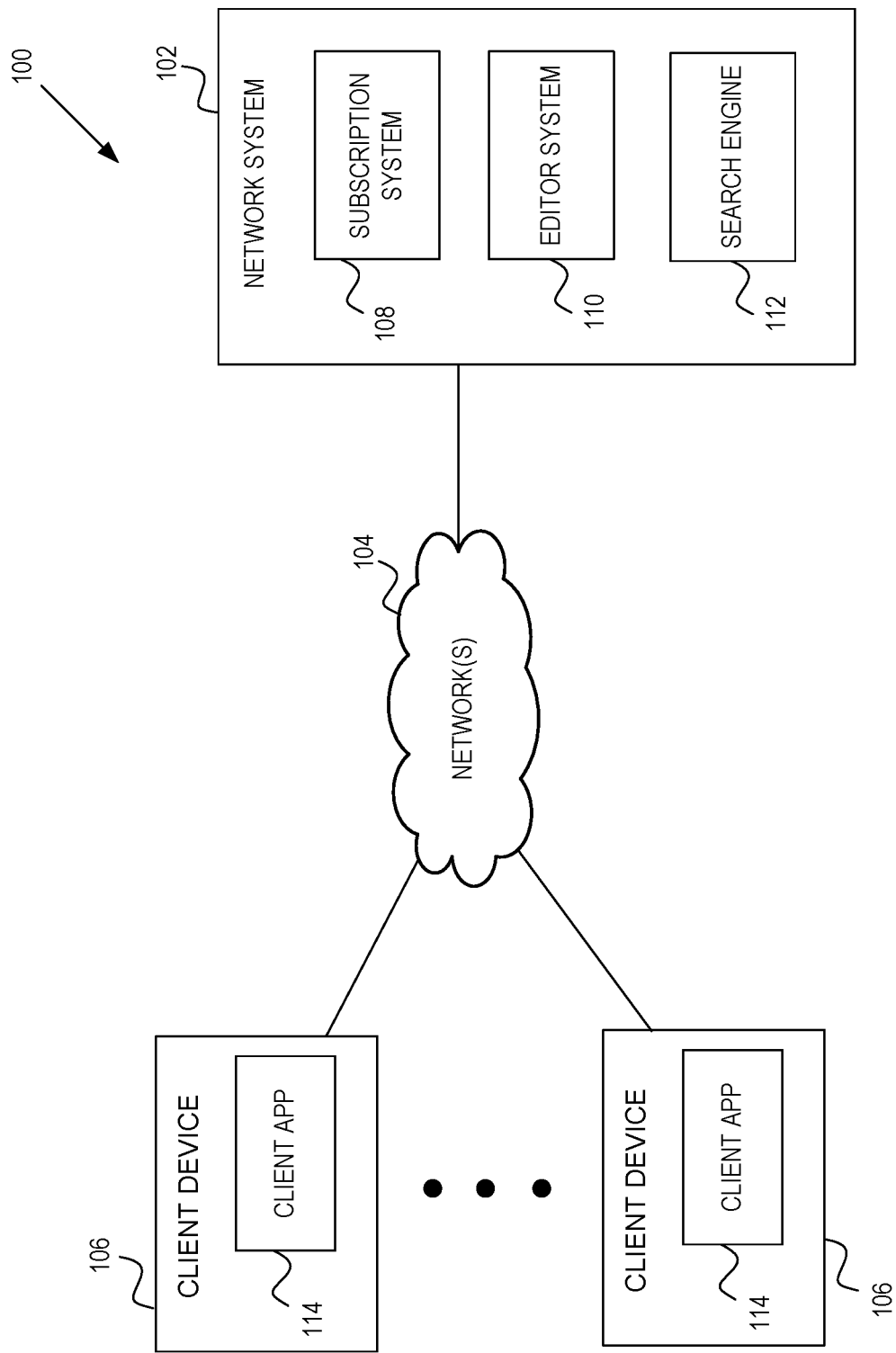
FIG. 1 is a diagram illustrating a network environment suitable for automatic content generation in a writing style of a user, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments provide a network system for automatically generating content that is contextually relevant in the writing style of a user. In example embodiments, a natural interface which allows for logical inputs (e.g., logical sentence text) in a bullet point outline format is provided. This enables users to express more complicated ideas rather than just a laundry list of concepts or keywords which may result in only being marginally relevant to the user's original intentions. The logical inputs are used to generate new content (referred to herein as "draft content") in the form of one or more paragraphs which may include additional, novel data based on search results performed by a coupled search engine. Example embodiments include a cloud-side system architecture that includes use of natural language generation models (e.g., Generative Pre-trained Transformer 3-GPT3) in combination with teacher-student knowledge distillation models (e.g., artificial intelligence modeling techniques that increases model prediction speed at little to no cost of prediction quality) and artificial intelligence (AI) generation models that allows for improved latency and energy efficiencies.

Example embodiments may also train one or more models such as a user style model that machine-learns a plurality of user styles. Based on the logical inputs received from a user, the network system can identify a user style from the plurality of user styles that is most similar and generate content that reads like it was written by the user.

In example embodiments, the generated draft content can be checked prior to presentation to the user. In some cases, a self-regulatory sensor detects whether the draft content includes offensive content. If offensive content is detected, the network system may regenerate the content. In some cases, the network system can perform a similarity check. If similar content is identified, then a citation that corresponds to a portion of the draft content that is similar can be provided (e.g., included in-line in the content). In some cases, the network system can also perform a grammar check prior to presenting the draft content to the user. Alternatively, the grammar check can occur after presentation (e.g., as the user is viewing the draft content).

The context and additional data for inclusion in the generated content can be obtained from system-coupled applications or components. In example embodiments, the network system can include a subscription service or system that includes, for example, a word processing component, a search engine, a spreadsheet component, and/or a presentation component in addition to an editor system that generates the draft content. Thus, for example, the network system can learn user styles from documents generated by various users of the subscription system (e.g., the word processing component or presentation component). In some embodiments, the network system can obtain additional data that is relevant and related to the logical inputs by performing an online content search using a search engine provided by, or associated with, the network system.

As a result, example embodiments provide a technical solution for automatically generating contextually relevant content that is in a writing style of a user. The technical solution includes training and using one or more machine-learning (ML) models that can identify a user's writing style; identify a context/direction for the draft content; determine additional, relevant information for inclusion in the draft content; and/or detect offensive content. As a result, one or more of the methodologies described herein facilitate solving the technical problem of automatic content generation in a user's writing style that is contextually relevant.

FIG. 1 is a diagram illustrating a network environment 100 suitable for automatic content generation in a writing style of a user, in accordance with example embodiments. A network system 102 is communicatively coupled, via a network 104, to a plurality of client devices 106. In some embodiments, the network system 102 is associated with a single entity (e.g., software provider). The network system 102 comprises a subscriber system 108 such as, for example, Microsoft 365, an editor system 110, and a search engine 112. The subscriber system 108 can comprise a cloud-based software-as-a-service (SaaS) system that provides a plurality of applications that generate, edit, and display documents that can be used (e.g., accessed, analyzed) by the editor system 110. For example, the subscriber system 108 can provide a word processing application that manages text documents, a spreadsheet application that manages spreadsheets, a presentation application that manages presentation slides, and a meeting application that can generate transcriptions of virtual meetings. In some embodiments, the components of the subscriber system 108 works with a corresponding client application at the client device 106.

The editor system 110 is configured to automatically generate content that is contextually relevant, fluent, and coherent in a writing style of the user. The editor system 110 comprises or accesses one or more machine-trained models for natural language processing and identifying a writing style of the user. In example embodiments, a user begins composing a document and types an outline in the form of bullet points. In some cases, background facts and knowledge can be extracted from a search performed by a search engine based on the bullet points. The editor system 110 then generates draft content (e.g., a fluent paragraph) following the outline the user specified and can add additional sentences that are related to the bullet points based on the facts and knowledge extracted from the search results. The editor system 110 will be discussed in more detail in connection with FIG. 2 and FIG. 3 below.

The search engine 112 is a component of the network system 102 that performs searches on the Internet. Example embodiments use the search engine 112 to search for background facts and knowledge for a topic based on the logical inputs. Thus, the network system 102 creates an ecosystem that can leverage a knowledge graph and provide search results that gives accurate facts based on enterprise-based information.

Each client device 106 is a device of a user of the network system 102. The client devices 106 may comprise, but are not limited to, a smartphone, tablet, laptop, multi-processor systems, microprocessor-based or programmable consumer electronics, game consoles, set-top boxes, a server, or any other communication device that can perform operations with respect to the network system 102 via the network 104. The operations can include, for example, generating, editing, and viewing documents associated with the subscription system 108 and/or the editor system 110.

In example embodiments, each client device 106 comprises one or more client applications 114 that communicates with the network system 102 for added functionality. For example, the client application 114 may be a local version of a word processing application or component of the subscription system 108. Accordingly, the client application 114 allows a user to create, edit, and display a document on the client device 106. The added functionality provided to the client application 114 by the network system 102 includes, for example, cloud-based storage of documents and operations of the editor system 110.

While a user is using the client application 114, the user may encounter writer's block or otherwise need some assistance with getting their thoughts fluently written. In example embodiments, the client application 114 provides an editor option (e.g., icon or button) on an editor pane. The selection causes a user interface component associated with the client application 114 to generate and display a dialog box (e.g., a popup window) where the user can type his logical inputs in a bullet point format (referred to interchangeably as "bullet points"). When all the bullet points have been inputted, the user can then select an option to create draft content that transmits a signal to the editor system 110. After generating the draft content, the editor system 110 provides the draft content back to the client application 114 which displays the draft content in the dialog box along with a selectable option to add the draft content to the document (e.g., at the end of the document).

Depending on the form of the client devices 106, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks).

In another example, the connection to the network 104 is a Wireless Fidelity (Wi-Fi, IEEE 802.11x type) connection, a Worldwide Interoperability for Microwave Access (WiMAX) connection, or another type of wireless data connection. In some embodiments, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated In example embodiments, any of the systems, devices, or services (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system, device, or machine. For example, a special-purpose computer system able to implement any one or more of the methodologies described herein is discussed below with respect to FIG. 8, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any of the components illustrated in FIG. 1 or their functions may be combined, or the functions described herein for any single component may be subdivided among multiple components. Additionally, any number of client devices 106 may be embodied within the network environment 100. While only a single network system 102 is shown, alternative embodiments contemplate having more than one network system 102 to perform the operations discussed herein (e.g., each localized to a particular region).

Figure 2:
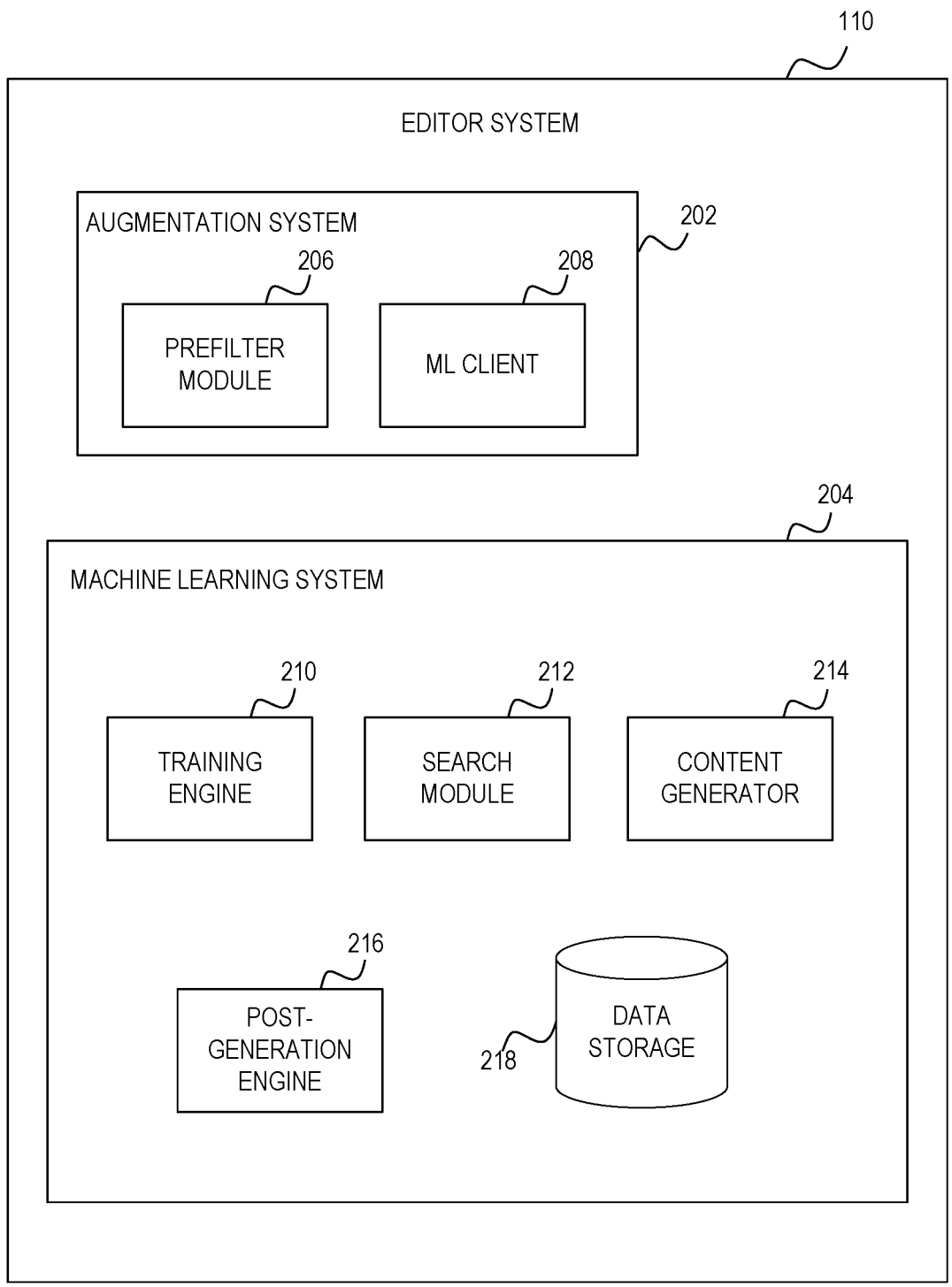
FIG. 2 is a diagram illustrating components of an editor system, according to some example embodiments.

FIG. 2 is a diagram illustrating components of the editor system 110, according to some example embodiments. The editor system 110 is configured to analyze logical inputs (e.g., bullet points) received from a user and generate contextually relevant, fact-based draft content (e.g., a paragraph) that is in the writing style of the user. To enable these operations, the editor system 110 comprises an augmentation system 202 and a machine learning system 204 that are configured to communicate with each other (e.g., via a bus, shared memory, or a switch), whereby the augmentation system 202 and the machine learning system 204 each includes components that enable the automatic content generation functionalities. Alternative embodiments may comprise more or less components, combine the functions of some these components into a single component, or making some components optional.

In example embodiments, a user may activate content generation via a selection of an editor option provided by their client application 114. The selection causes a user interface component associated with the client application 114 to display a dialog box where the user can type his logical inputs in a bullet point format. When all the bullet points have been inputted, the user can then select a generate option to create draft content. The selection causes a signal to be transmitted to the editor system 110 (e.g., the augmentation system 202). The signal can include the logical inputs and indications of customization selections that will be discussed in more detail below.

In example embodiments, the augmentation system 202 is a middle layer augmentation loop that comprises a prefilter module 206 and a machine learning (ML) client 208. When the logical inputs are received by the augmentation system 202, the prefilter module 206 performs a check to ensure that the signal is not associated with an adversarial attack on the network system 102. If the prefilter module 206 determines that the signal (e.g., data) received is safe, then the ML client 208 converts the logical inputs (e.g., the bullet points) into a machine-readable format. The ML client 208 then sends the formatted data in a generation request containing the bullet points and metadata (e.g., the customization selections) to the machine learning system 204.

The machine learning system 204 comprises a cloud-based machine learning platform where one or more ML models are used to convert the bullet points into draft content. In some embodiments, the draft content is a full paragraph, while in alternative embodiments the draft content can take other forms (e.g., multiple paragraphs, an email). Once generated, the draft content is passed back to the augmentation system 202, which transmits the draft content to the client application 114 at the client device 106. The machine learning system 204 may comprise a training engine 210, a search module 212, a content generator 214, a post-generation engine 216, and a data storage 218. In alternative embodiments, some of the components of the machine learning system 204 may be located elsewhere at the network system 102. Further still, some embodiments may not comprise the augmentation system 202 and the logical inputs (e.g., bullets points) are formatted by the machine learning system 204.

The training engine 210 is configured to train/retrain machine-learning (ML) models used by the editor system 110. The training engine 210 can access training data from the other components of the network system 102 (e.g., the subscription system 108) and extract features that are used to train ML models. Additionally, the training engine 210 can receive feedback from the other components of the network system 102 and extract features that are used to retrain the ML models.

In some embodiments, the training engine 210 trains a style model that is used, during runtime, to identify a writing style in which to generate the draft content that will read as if the user drafted the content themselves. In order to train the style model, the training engine 210 accesses documents written by a plurality of users of the network system 102. These documents can be accessed from the subscription system 108 which generates, edits, and stores these documents. The training can include training by types of users, teams, organizations, and/or company such that generated content will sound authentic and proper to the user, team, organization, and/or company.

The training engine 210 can also train one or more content generation models that, at runtime, generate the draft content. As such, the content generation model learns from a training phase where it is presented with carefully prepared points in paragraphs. As a result, the content generation model learns not only to creatively write content, but also what is the most appropriate content under the context of what the user gives in the bullet points. Because the appropriate content is different for different topics or based on different set of bullet points, the training data set will be massive with different levels of knowledge and different topics.

Additionally, the training engine 210 can train a relevant information model that, at runtime, can determine additional relevant information to provide to the content generator 214. In various embodiments, the editor system 110 can include the additional relevant information (based on the bullet points) when generating the fact-based content. In example embodiments, relevant definitions, facts, entities, and concepts can be extracted from searches and used to train the relevant information model for various topics.

In some embodiments, the training engine 210 may also train a censor model. The censor module is configured to detect whether generated draft content contains sensitive or offensive content. As such, the censor model may be trained with training data that indicates various sensitive, offensive, rude, or politically incorrect statements.

In training some of the ML models, labeled data which encompasses a wide range of genre, topic, and user writing styles are used. All of the labeled data is fed as training examples to the various models. In example embodiments, each model may be a neural network, natural language processing model which when given the labeled data learns. Each model may also learn from unlabeled paragraphs that are obtained from the subscription system 108 (e.g., internal database of word documents, legal documents). The result is one or more models that have higher quality and covers much wider genres and topics.

While a plurality of different models is discussed as being trained by the training engine 210, some embodiments may train a single model that perform some or all of the operations of the user style model, the content generation model, and/or the relevant information model. In other alternative embodiments, the machine learning system 204 may access and use one or more trained ML models from other systems (e.g., external to the network system 102).

The search module 212 is configured to trigger a search for additional relevant information based on the bullet points. In example embodiments, the search module 212 triggers the search engine 112 to search for the additional relevant information in response to a customization selection by the user that allows the addition of information in the draft content. Since the search engine 112 and the search module 212 are a part of the network system 102, the search module 212 can leverage a knowledge graph associated with an enterprise based on usage of the network system 102. Thus, the search module 212 can (e.g., using the relevant information model trained to identify relevant information) extract relevant definitions and facts, entities, and/or concepts from the search results for use by the generation module 214 in generating the draft content. The relevant additional information is then passed to the content generator 214.

The content generator 214 is configured to generate the draft content using the received logical inputs. In example embodiments, the content generator 214 uses one or more machine-learning (ML) models to analyze the bullet points, determine a user style, and generate the draft content. With the bullet points, though logic, the ML model can decipher and understand the user's intentions. Using the ML model, the content generator 214 can also analyze the context of what was written (e.g., the bullet points) and from that identifies the user's writing style. In one embodiment, a ML model (e.g., style model) intelligently determines, from its prior experience of seeing all kinds of user writing styles, what is the closest style to the requesting user. Thus, the ML model identifies which writing style from a plurality of different writing styles is most similar to the style of the logical inputs received from the requesting user.

The content generator 214 can also use the same ML model or a different ML model (e.g., the content generation model) and, based on the bullet points, the user style, and any additional relevant information received from the search module 212, generate the draft content (e.g., at least one paragraph). In particular, the content generator 214, using the ML model, can analyze the context of what was written (e.g., the bullet points) and from that know the direction the user wants the draft content to go (e.g., the context of the draft content). The draft content may follow the outline of the bullet points and incorporate additional relevant information if allowed. In example embodiments, the ML model learns (from training samples) the association between bullet points and a paragraph (e.g., content generation), while also incorporating user styles from the context (e.g., bullet points). Furthermore, the content generator 214 can adjust the length of the draft content or include inline citations based on customization selections.

In some cases, the style of the draft content may also be affected based on the type of draft content to be generated. For example, a news article may comprise more facts and less opinion. In another example, an email may use shorter sentences and be more concise.

The post-generation engine 216 is configured to perform one or more assessments of the generated draft content. Some or all of the assessments can be performed prior to presenting the draft content to the user. These assessments can check for offensive content, similarity (e.g., plagiarism), and quality. The post-generation engine 216 will be discussed in more detail in connection with FIG. 3 below.

The editor system 110 also includes the data storage 218 configured to store various information generated and used by the editor system 110. In example embodiments, the data storage 218 can store the ML models used by the machine learning system 204. While the data storage 218 is shown as a single storage device, the data storage 218 can comprise a plurality of storage devices (e.g., each storing a different type of model).

Figure 3:
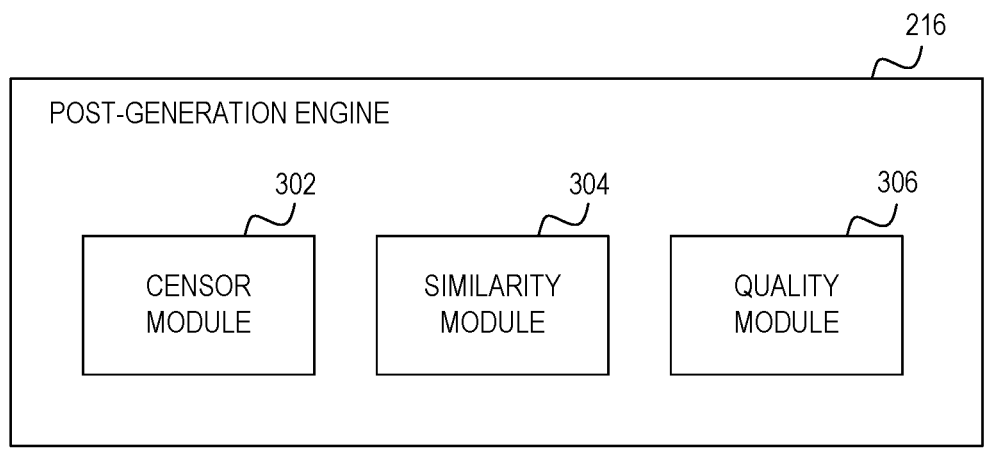
FIG. 3 is a diagram illustrating components of a post-generation engine, according to some example embodiments.

FIG. 3 is a diagram illustrating components of the post-generation engine 216, according to some example embodiments. The post-generation engine 216 is configured to perform one or more assessments or checks of the generated draft content for quality. To enable these operations, the post-generation engine 216 comprises a censor module 302, a similarity module 304, and a quality module 306.

The censor module 302 is configured to assess the generated draft content for offensive or sensitive content. In example embodiments, the censor module 302 comprises a self-regulatory sensor that uses an artificial intelligence (AI)-based model that detects if something sensitive, rude, or inappropriate is part of the generated content. If offensive language is detected, the censor module 302 triggers the content generator 314 to regenerate the content to remove the offensive portion of the draft content.

The similarity module 304 is configured to assess the generated draft content for similarity with prior published information. Thus, the similarity module 304 can perform a plagiarism check. In one embodiment, the similarity module 304 can trigger the search engine 112 to search for published documents that have similar wording and context. Similarity may be defined as a percentage match (e.g., predetermined threshold) between the generated draft content and content in the published document (e.g., 85%). If the similarity module 304 identifies content in a published document that matches at or above the predetermined threshold, then the similarity module 304 may provide a citation corresponding to the published document. The citation can be included inline in the draft content. In some embodiments, this similarity assessment may occur after the draft content is returned to the client device 106 and is being displayed to the user.

The quality module 306 is configured to assess the generated draft content for grammar and spelling. Thus, the quality module 306 performs a grammar and spell check on the drafted content. In some cases, the quality module 306 may automatically correct the grammar or spelling errors. In other cases, the quality module 306 may visually distinguish (e.g., highlight, underline) any detected grammar or spelling issues and allow the user to decide whether to make changes. In some embodiments, the quality assessment may occur after the draft content is returned to the client device 106 and is being displayed to the user.

Figure 4:
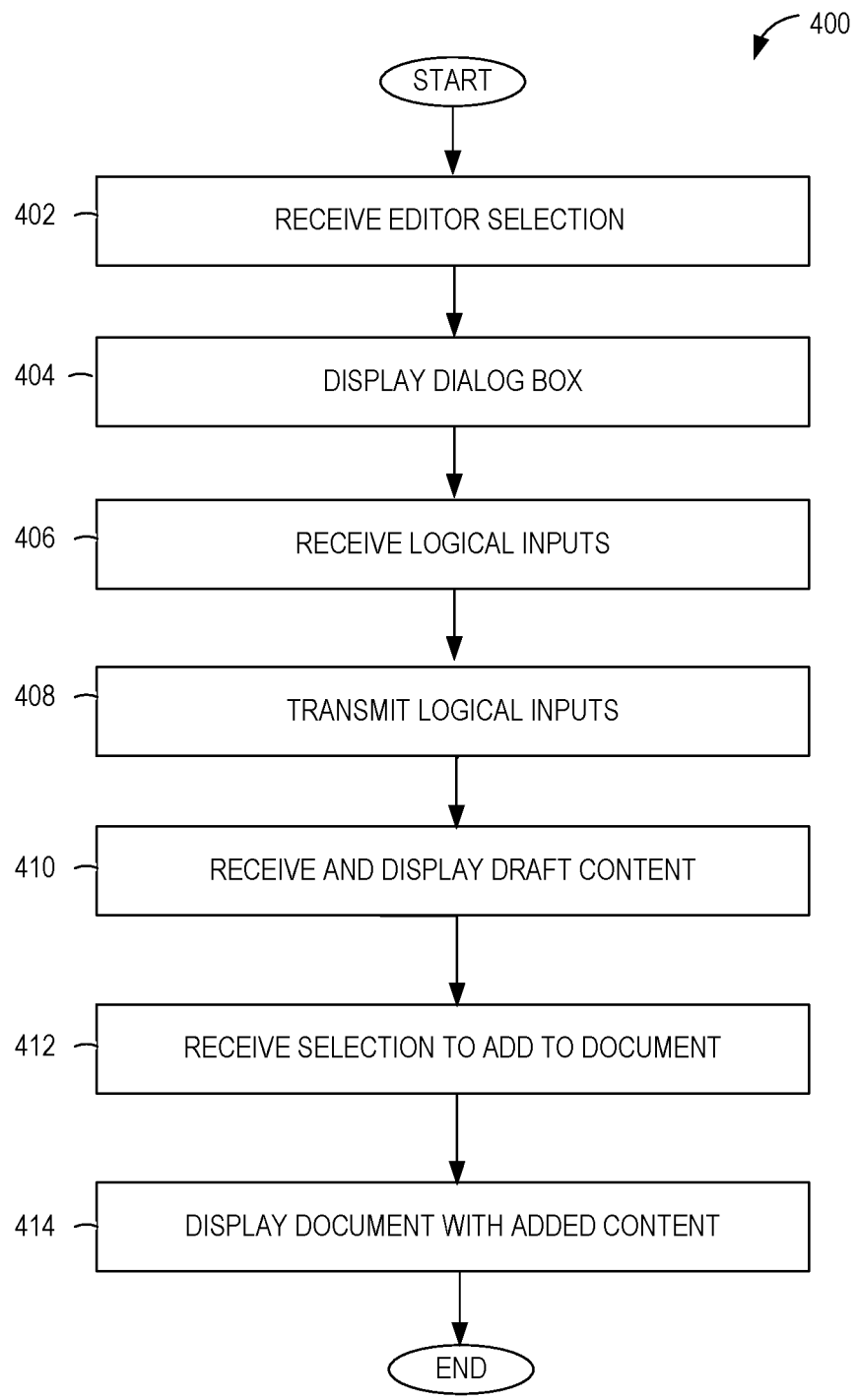
FIG. 4 is a flowchart illustrating operations of a method for automatic content generation at a client device, according to some example embodiments.

FIG. 4 is a flowchart illustrating operations of a method 400 for automatic content generation at a client device (e.g., client device 106), according to some example embodiments. Operations in the method 400 may be performed by the network system 102 in the network environment 100 described above with respect to FIG. 1-FIG. 3. Accordingly, the method 400 is described by way of example with reference to these components in the network system 102. However, it shall be appreciated that at least some of the operations of the method 400 may be deployed on various other hardware configurations or be performed by similar components residing elsewhere in the network environment 100. Therefore, the method 400 is not intended to be limited to these components.

In example embodiments, a client application (e.g., client application 114) on the client device is activated and enables a user to create, edit, and display a document on the client device 106. For example, the client application may be a local version of a word processing application. While a user is using the client application, the user may encounter writer's block or otherwise need some assistance with generating content for the document. In example embodiments, the client application provides an editor option (e.g., icon or button) on an editor pane. In operation 402, the client device receives a selection of this editor option.

In response to receiving the selection, the client application causes display of a dialog box (e.g., a popup window) in operation 404. For example, the selection causes a user interface component associated with the client application 114 to generate and display the dialog box where the user can type logical inputs in a bullet point format.

In operation 406, the client application receives the logical inputs. For example, the user can provide their bullet points in an input portion of the dialog box. In some cases, the dialog box may include fields where the user can indicate a type of document that is being generated by the user and/or a length of the document. Further still, the dialog box may allow the user to indicate whether additional relevant information and/or inline citations can be automatically added by the editor system 110.

In operation 408, the client application transmits the logical inputs to the editor system 110 as a signal. The signal may also include indications of customization selections such as the document type and/or length, whether additional relevant information can be automatically added, and whether inline citations can be automatically added. The editor system 110 will then generate draft content based on the logical inputs and customization selections.

In operation 410, the client application receives and displays the draft content. In example embodiments, the draft content is displayed in a preview portion of the dialog box, which may replace the input portion. The draft content is displayed with an option to add the draft content to the document. In some cases, an option to go back may also be provided. By selecting the back option, the user may go back and change one or more of the logical inputs, add further logical inputs, or change customization selections which may result in different draft content being returned.

In operation 412, the client application may receive a selection to add the draft content to the document. In response, the draft content is added to the document. For example, the draft content is added to the end of the document. The updated document is then displayed in operation 414 with the added draft content.

Figure 5:
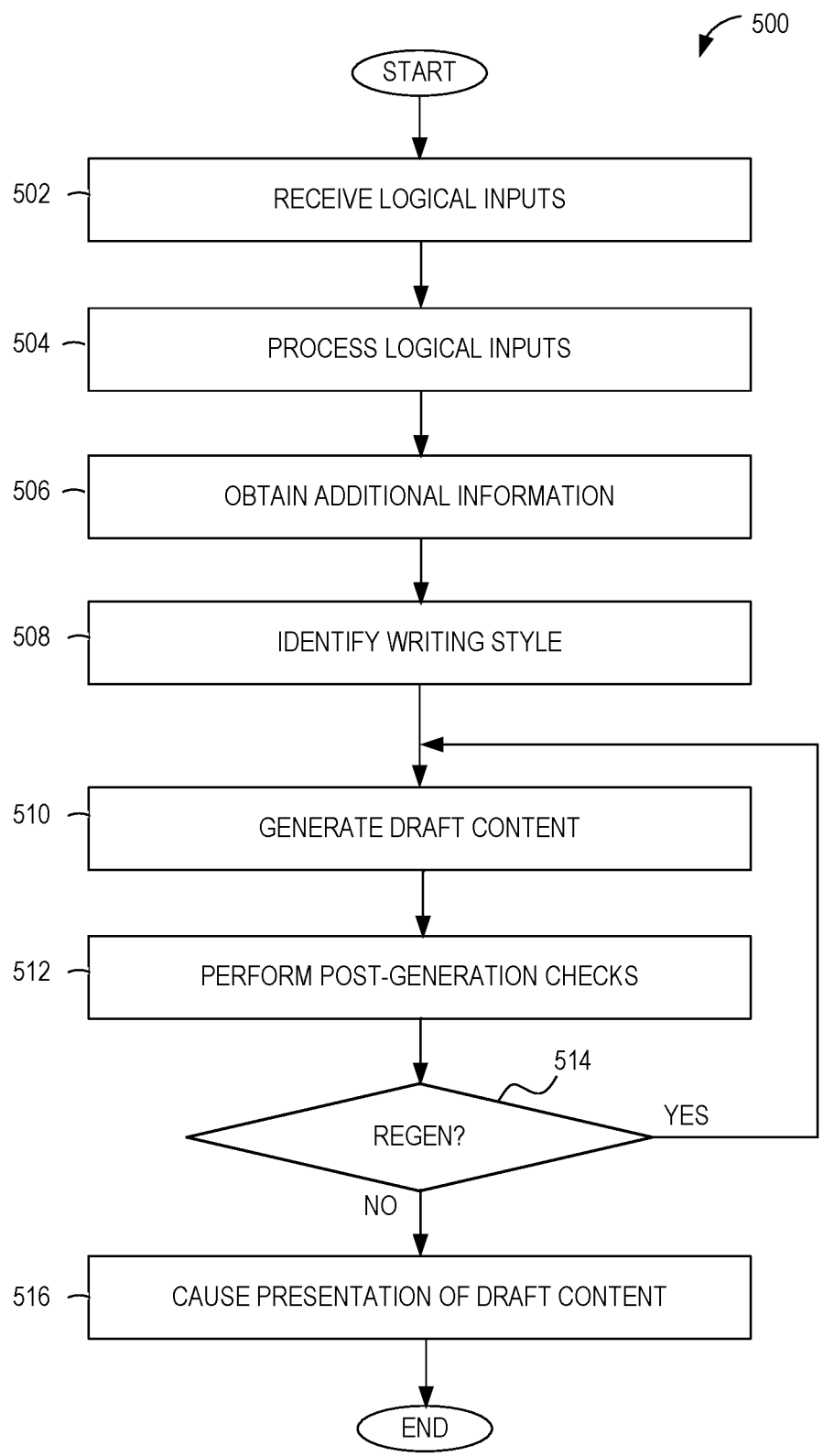
FIG. 5 is a flowchart illustrating operations of a method for automatic content generation at a network system, according to some example embodiments.

FIG. 5 is a flowchart illustrating operations of a method 500 for automatic content generation at a network system, according to some example embodiments. Operations in the method 500 may be performed by the editor system 110 in the network environment 100 described above with respect to FIG. 1-FIG. 3. Accordingly, the method 500 is described by way of example with reference to these components in the network system 102. However, it shall be appreciated that at least some of the operations of the method 500 may be deployed on various other hardware configurations or be performed by similar components residing elsewhere in the network environment 100. Therefore, the method 500 is not intended to be limited to these components.

In operation 502, the editor system 110 receives the logical inputs from the client device. In example embodiments, the augmentation system 202 receives a signal containing the logical inputs and any additional information (e.g., customization selections such as the document type and/or length, whether additional relevant information can be automatically added, and/or whether inline citations can be automatically added).

In operation 504, the editor system 110 processes the signal including the logical inputs. In example embodiments, the augmentation system 202 is a middle layer augmentation loop that comprises a prefilter module 206 and a machine learning (ML) client 208. The prefilter module 206 performs a check to ensure that the signal is not associated with an adversarial attack on the network system 102. If the signal and data is safe, then the ML client 208 converts the logical inputs (e.g., the bullet points) into a machine-readable format.

In operation 506, the editor system 110 can obtain additional relevant information. In example embodiments, the search module 212 is configured to trigger a search, by the search engine 112, for additional relevant information based on the bullet points. Since the search engine 112 and the search module 212 are a part of the network system 102, the search module 212 can leverage a knowledge graph associated with an enterprise based on usage of the network system 102. Thus, the search module 212 can extract relevant definitions and facts, entities, and/or concepts from the search results (e.g., using a model trained to identify relevant information) for use by the generation module 214 in generating the draft content. In embodiments where the user does not want additional relevant information to be added, operation 506 is not performed. Therefore operation 506 is optional.

In operation 508, the editor system 110 identifies a writing style in which to generate the draft content. In example embodiments, the content generator 214 uses one or more machine-learning (ML) models to analyze the bullet points in order to determine the writing style. The ML model can analyze the context of the bullet points and from that identify the user style. In one embodiment, the ML model (e.g., style model) intelligently determines which writing style from a plurality of different writing styles is most similar to the logical inputs received from the user.

In operation 510, the editor system 110 generates the draft content. In example embodiments, the content generator 214 uses the bullet points, the user style, and any additional relevant information received from the search module 212 to generate the draft content (e.g., at least one paragraph). In some cases, the content generator 214 uses a ML model to analyze the context and direction of what was written (e.g., the bullet points) and from that knows the context and direction the user wants the draft content to go (e.g., the context/direction of the draft content). The content generator 214 then converts the bullet points into sentences. In embodiments where additional relevant information is enabled, the content generator 214 positions the additional relevant information in appropriate locations within the draft content (e.g., before/after certain sentences generated from the bullet points).

In some cases, the content generator 214 takes into consideration an indication by the user as to the length of the draft content. Thus, for example, if the indicated length is short, then the content generator 214 may only convert the bullet points into sentences in the writing style identified for the user and include little to no additional relevant information. However, if the user indicated a length of medium or long, then the content generator 214 can add more relevant additional information.

Further still, the content generator 214 can take into consideration a type of document that is being generated by the user. For example, if the document type is an email, the draft content may be more concise and to the point (e.g., shorter sentences) in order to keep the email shorter in length and more readable. In contrast, if the document is a news article, the content generator 214 may generate content that is more informative and, if additional information is allowed, includes more quotes and additional facts. Other types of documents can include an essay, a blog, a marketing document, and a legal document.

In operation 512, the editor system 110 performs one or more post-generation checks. In some cases, the censor module 302 evaluates the generated draft content for offensive or sensitive content. The censor module 302 may use a censor model that detects if content (e.g., a phrase or sentence) is insensitive, rude, or inappropriate (collectively referred to as "offensive language"). If offensive language is detected, then in operation 514, a determination is made to regenerate the content returning the method 500 to operation 510.

In some cases, the similarity module 304 evaluates the generated draft content for similarity with prior published information. Thus, the similarity module 304 performs a plagiarism check. In one embodiment, the similarity module 304 triggers the search engine 112 to search for published documents that have similar wording and context (e.g., a same or very similar sentence). If the similarity module 304 identifies content in a published document that matches at or above the predetermined similarity threshold, then the similarity module 304 may include a citation corresponding to the published document in the draft content. The citation can be included inline in the draft content.

In some cases, the quality module 306 evaluates the generated draft content for grammar and spelling errors/issues. Thus, the quality module 306 performs a grammar and spell check on the drafted content. In some cases, the quality module 306 may automatically correct the grammar or spelling errors. In other cases, the quality module 306 may visually distinguish (e.g., highlight, underline) any detected grammar or spelling issues and allow the user to decide whether to make changes.

If, in operation 514, a determination is made that the draft content does not need to be regenerated (e.g., the censor module 302 does not detect any offensive language), then the editor system 110 causes presentation of draft content in operation 516. In example embodiments, the editor system 110 returns the draft content (e.g., via the augmentation system 202) to the client application at the client device. However, if the draft content needs to be regenerated, then the method 500 returns to operation 510.

Figure 6:
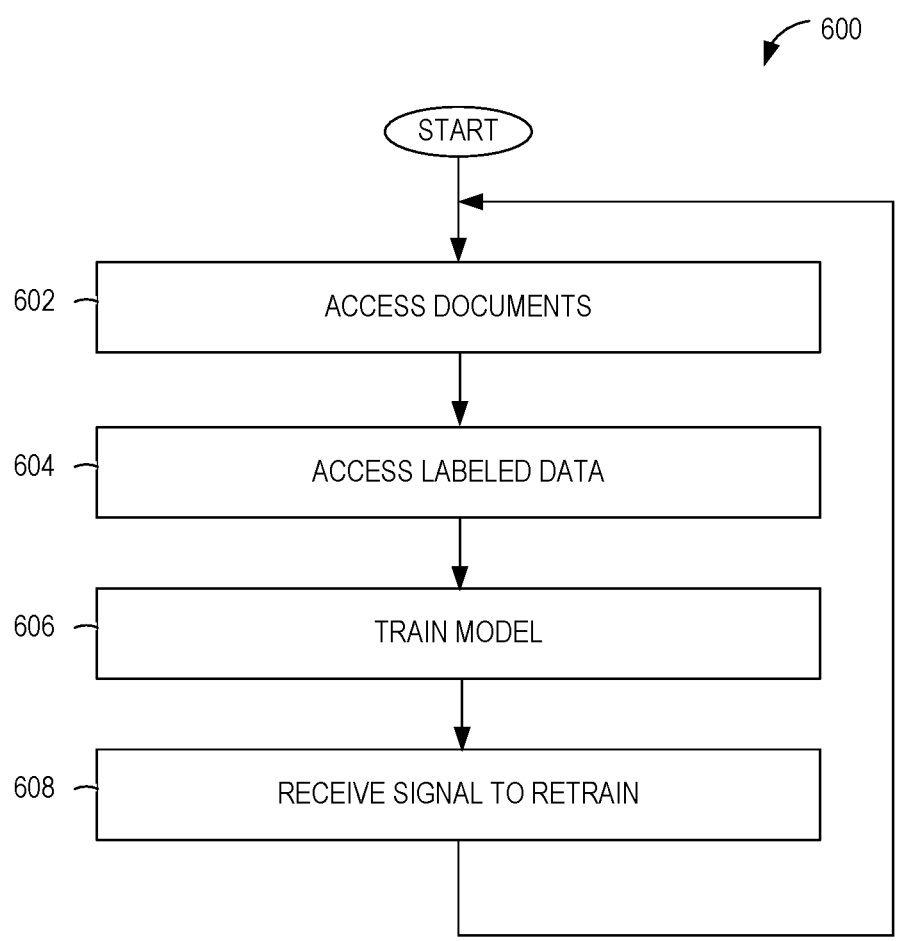
FIG. 6 is a flowchart illustrating operations of a method for training one or more models used for automatic content generation, according to some example embodiments.

FIG. 6 is a flowchart illustrating operations of a method 600 for training one or more ML models used in automatic content generation, according to some example embodiments. Operations in the method 600 may be performed by the network system 102 (e.g., the training engine 210) in the network environment 100 described above with respect to FIG. 2. Accordingly, the method 600 is described by way of example with reference to these components in the network system 102. However, it shall be appreciated that at least some of the operations of the method 600 may be deployed on various other hardware configurations or be performed by similar components residing elsewhere in the network environment 100. Therefore, the method 600 is not intended to be limited to these components.

In operation 602, the training engine 210 accesses documents from the network system 102. The documents can provide unlabeled paragraphs that the training engine 210 obtains from internal database of word documents, legal documents, and so forth. Because the network system 102 is an ecosystem that comprises different applications and components used by a plurality of users, the training engine 210 can leverage knowledge (and knowledge graphs) for a plurality of different users based a range of documents.

In operation 604, the training engine 210 accesses labeled data. The labeled data can encompass a wide range of genre, topic, or user styles.

In operation 606, one or more models are trained by the training engine 210. In example embodiments, the labeled data and the unlabeled paragraphs are fed as training data to the model being training. The machine learning can occur using, for example, linear regression, logistic regression, a decision tree, an artificial neural network, k-nearest neighbors, and/or k-means. Thus, for example, the model can be trained to identify a plurality of different writing styles. Similarly, the model can be trained on how to generate contextually relevant content based on a tone/direction of bullet points. The trained model(s) are then used by the other components of the editor system 110.

In operation 608, the training engine 210 can receive a signal to retrain the model(s) using new or updated data. Thus, operations 602-606 of the method 600 are periodically repeated.

While the operations of FIG. 4-FIG. 6 are shown in a particular order, alternative embodiments may practice the operations in a different order. Additionally, one or more of the operations may be made optional in various embodiments.

Figure 7A:
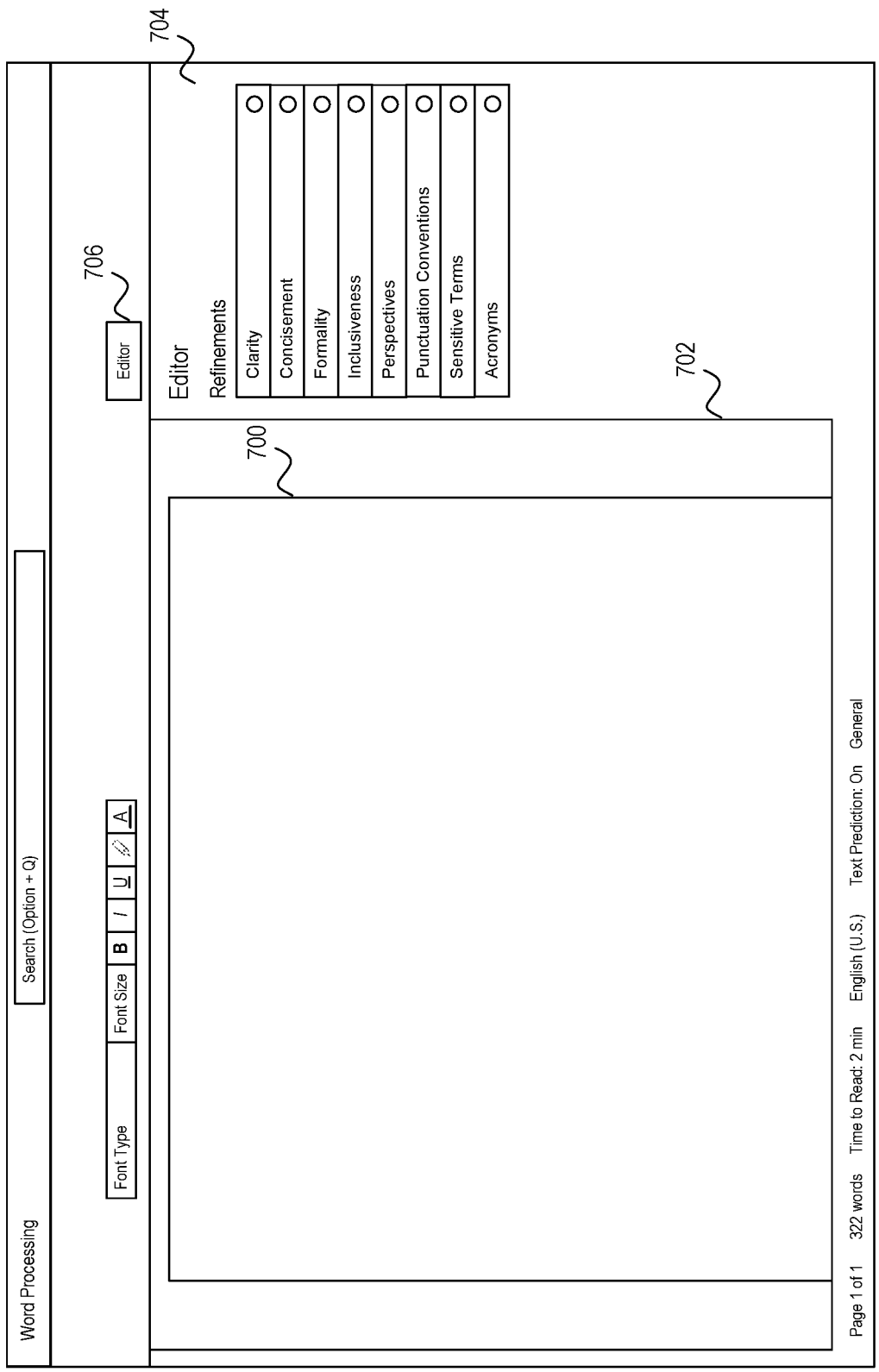

FIG. 7A to FIG. 7E are example screenshots illustrating user interfaces used in automatic content generation that are displayed at the client device 106. FIG. 7A shows a screenshot of a user interface provided by a client application (e.g., the client application 114 on the client device 106). In the present example, the client application is a word processing application that presents a document 700 in a primary portion 702 where a user can create and edit content. To a side of the primary portion 702 is an editor pane 704. Above the editor pane 704 is an editor option 706. In other example, the editor option 706 can be located within the editor pane 704 or elsewhere on the user interface.

Figure 7B:
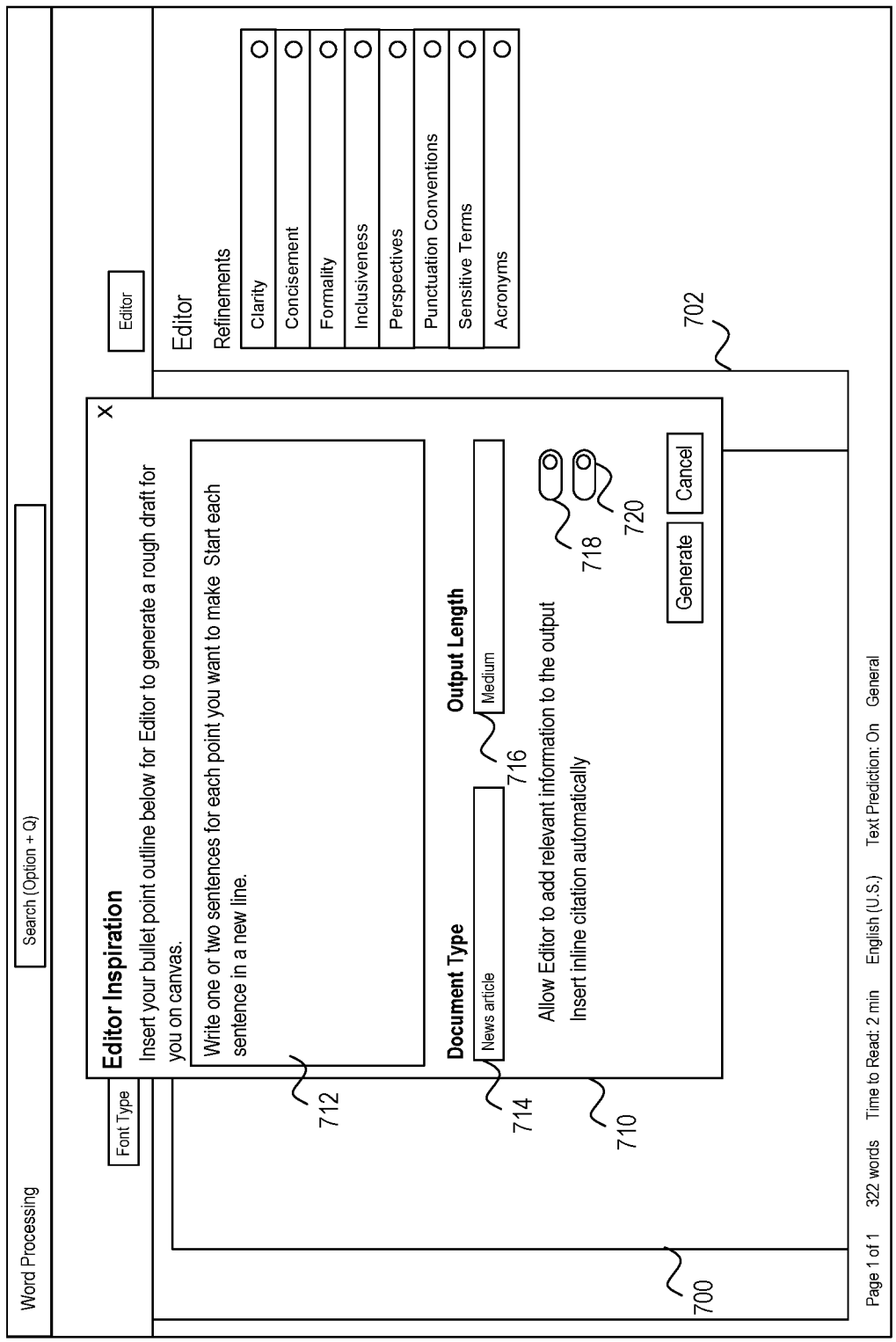

Selection of the editor option 706 triggers the automatic content generation process. Specifically, in response to receiving the selection, the client application causes display of a dialog box 710 (e.g., a popup window) that is an editor user interface component positioned over the document 700 in the primary portion 702 as shown in FIG. 7B. The dialog box 710 includes an input portion 712 where the user can provide logical inputs in a bullet point style. In some embodiments, the dialog box 710 may include customization fields/options in which the user can indicate different aspects for the draft content. For instance, the user can indicate a document type in a document type field 714. In some cases, the document type can be selected from a drop-down menu while in other cases, the user can input the document type. An output length field 716 allows the user to indicate a length of the draft content. Hereto, the length can be selected from a drop-down menu or be manually inputted by the user. The dialog box 710 may also include an option (e.g., add information toggle 718) to allow the editor system 110 to add relevant information to the draft content and an option (e.g., citation toggle 720) to allow for automatic insertion of inline citations.

Figure 7C:
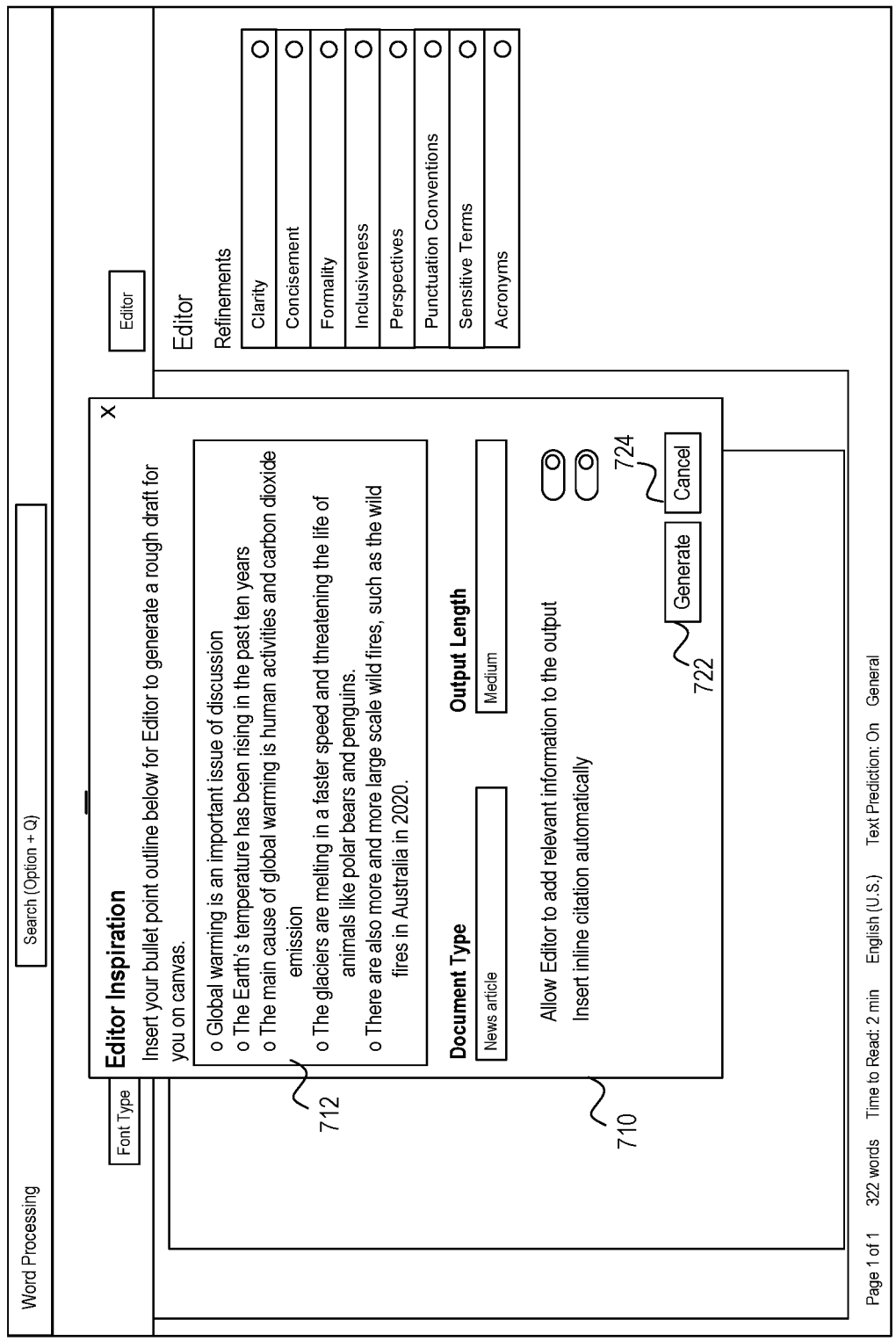

Referring now to FIG. 7C, the dialog box 710 is now shown with logical inputs entered in the input portion 712. The logical inputs can be entered in bullet point format and comprise sentences or phrases that indicate thoughts that the user wants to include in the draft content. Once the user has completed entering the logical inputs, the user can select a generate icon 722 to transmit the logical inputs to the editor system 110 as a signal. The signal may also include other customization data such as the document type, length, whether additional relevant information can be automatically added, and/or whether inline citations can be automatically added. Alternatively, the user can select a cancel icon 724 to exit out of the automatic content generation process.

In response to selection of the generation icon 722, the client application receives and display a preview of the draft content as shown in FIG. 7D. In example embodiments, the draft content is displayed in a preview portion 730 of the dialog box 710, which replaces the input portion 712. The user can scroll the preview portion 730 to review the draft content. The draft content is displayed with an add option 732 to add the draft content to the document 700. In some cases, a back option 734 to go back may also be provided. By selecting the back option 734, the user may go back and change one or more of the logical inputs, add further logical inputs, or change a customization selection which may result in different draft content being returned.

Figure 7E:
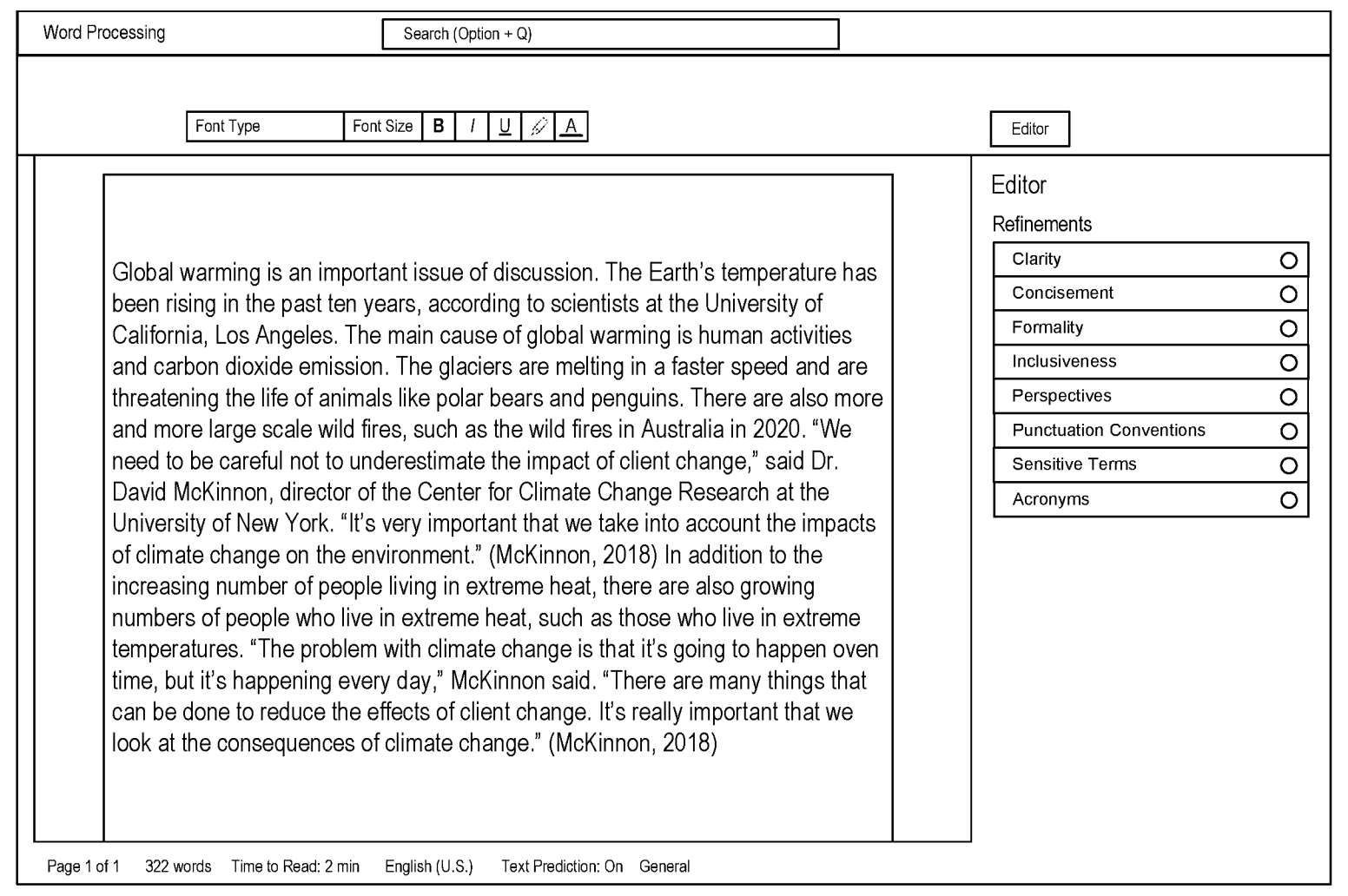

If the user selects the add option 732, then the draft content is added to the document 700 as shown in FIG. 7E. In example cases, the draft content is added to the end of the document 700.

Figure 8:
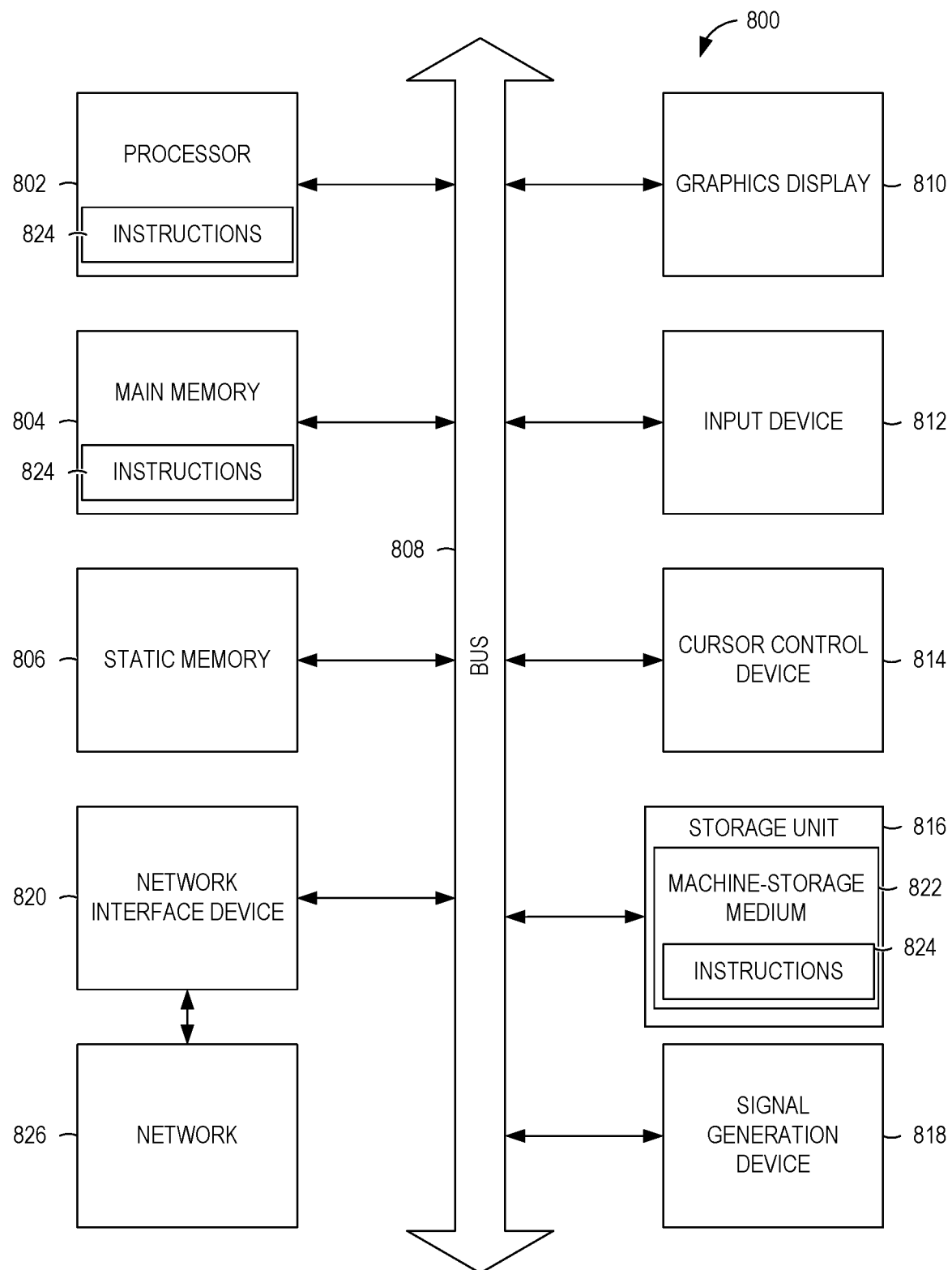
FIG. 8 is a block diagram illustrating components of a machine, according to some example embodiments, able to read instructions from a machine-storage medium and perform any one or more of the methodologies discussed herein.

FIG. 8 illustrates components of a machine 800, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 8 shows a diagrammatic representation of the machine 800 in the example form of a computer device (e.g., a computer) and within which instructions 824 (e.g., software, a program, an application, an applet, an app, or other executable code) for causing the machine 800 to perform any one or more of the methodologies discussed herein may be executed, in whole or in part.

For example, the instructions 824 may cause the machine 800 to execute the flow diagrams of FIG. 4 to FIG. 6. In one embodiment, the instructions 824 can transform the general, non-programmed machine 800 into a particular machine (e.g., specially configured machine) programmed to carry out the described and illustrated functions in the manner described.

In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824 (sequentially or otherwise) that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, or a cathode ray tube (CRT), or any other display capable of displaying graphics or video). The machine 800 may also include an input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a sound card, an amplifier, a speaker, a headphone jack, or any suitable combination thereof), and a network interface device 820.

The storage unit 816 includes a machine-storage medium 822 (e.g., a tangible machine-storage medium) on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered as machine-storage media (e.g., tangible and non-transitory machine-storage media). The instructions 824 may be transmitted or received over a network 826 via the network interface device 820.

In some example embodiments, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-storage medium," "device-storage medium," "computer-storage medium" (referred to collectively as "machine-storage medium 822") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 822 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 822 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 824 may further be transmitted or received over a communications network 826 using a transmission medium via the network interface device 820 and utilizing any one of a number of well-known transfer protocols (e.g., HTTP). Examples of communication networks 826 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 824 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for automatically generating content that is contextually relevant in the writing style of a user. The method comprises receiving, by an editor system via an editor user interface component displayed on a client device of a user, a plurality of logical inputs regarding a topic in bullet point format; in response to receiving the plurality of logical inputs, generating, by a content generator of the editor system, draft content using one or more machine learning (ML) models, the generating comprising identifying a writing style of the user from a plurality of machine-learned writing styles by applying the plurality of logical inputs to a first ML model of the one or more ML models; determining a context and direction for the draft content by applying the plurality of logical inputs to a second ML model of the one or more ML models; and based on the plurality of logical inputs, the identified writing style, and the context and direction, generating at least one paragraph of draft content in the writing style of the user that follows an outline associated with the bullet point format and comprises a same context and direction as the plurality of logical inputs; and causing presentation of the draft content in the editor user interface component.

In example 2, the subject matter of example 1 can optionally include wherein the logical inputs comprise one or more sentences that provide the context and direction on the topic.

In example 3, the subject matter of any of examples 1-2 can optionally include wherein the generating the draft content further comprises performing a search for additional relevant information based on the plurality of logical inputs; extracting relevant data from results of the search, the extracted relevant data including relevant definitions, facts, entities, or concepts; and incorporating at least some of the extracted relevant data in the draft content.

In example 4, the subject matter of any of examples 1-3 can optionally include wherein the extracting relevant data comprises using a third ML model trained to identify relevant information.

In example 5, the subject matter of any of examples 1-4 can optionally include performing a similarity check on the draft content; detecting that a portion of the draft content is within a similarity threshold of a portion of prior published content; and in response to the detecting, providing a citation to the portion of the prior published content in the draft content.

In example 6, the subject matter of any of examples 1-5 can optionally include detecting whether the draft content includes offensive content; and in response to detecting offensive content, triggering the content generator to generate alternative draft content.

In example 7, the subject matter of any of examples 1-6 can optionally include analyzing the draft content for spelling and grammar issues; and providing an indication of any detected spelling and grammar issues.

In example 8, the subject matter of any of examples 1-7 can optionally include wherein the causing presentation of the draft content comprises causing presentation of an option to add the draft content to a document that the user is drafting.

In example 9, the subject matter of any of examples 1-8 can optionally include training the one or more machine learning models with labeled data encompassing a range of genre, topics, and writing styles, the labeled data being obtained in part from documents generated by a coupled cloud-based system.

In example 10, the subject matter of any of examples 1-9 can optionally include wherein the first ML model and the second ML model are the same ML model.

In example 11, the subject matter of any of examples 1-10 can optionally include receiving, by the editor system via the editor user interface component displayed on the client device, an indication of one or more customization selections for customizing the draft content.

In example 12, the subject matter of any of examples 1-11 can optionally include wherein the indications of the one or more customization selections comprises an indication of a document type; an indication of a length for the draft content; an indication of whether additional relevant information can be automatically added; or an indication of whether inline citations can be automatically added.

Example 13 is a system for automatically generating content that is contextually relevant in the writing style of a user. The system comprises one or more hardware processors and a memory storing instructions that, when executed by the one or more hardware processors, cause the one or more hardware processors to perform operations comprising receiving, by an editor system via an editor user interface component displayed on a client device of a user, a plurality of logical inputs regarding a topic in bullet point format; in response to receiving the plurality of logical inputs, generating, by a content generator of the editor system, draft content using one or more machine learning (ML) models, the generating comprising identifying a writing style of the user from a plurality of machine-learned writing styles by applying the plurality of logical inputs to a first ML model of the one or more ML models; determining a context and direction for the draft content by applying the plurality of logical inputs to a second ML model of the one or more ML models; and based on the plurality of logical inputs, the identified writing style, and the context and direction, generating at least one paragraph of draft content in the writing style of the user that follows an outline associated with the bullet point format and comprises a same context and direction as the plurality of logical inputs; and causing presentation of the draft content in the editor user interface component.

In example 14, the subject matter of example 13 can optionally include wherein the generating the draft content further comprises performing a search for additional relevant information based on the plurality of logical inputs; extracting relevant data from results of the search, the extracted relevant data including relevant definitions, facts, entities, or concepts; and incorporating at least some of the extracted relevant data in the draft content.

In example 15, the subject matter of any of examples 13-14 can optionally include wherein the operations further comprise performing a similarity check on the draft content; detecting that a portion of the draft content is within a similarity threshold of a portion of prior published content; and in response to the detecting, providing a citation to the portion of the prior published content in the draft content.

In example 16, the subject matter of any of examples 13-15 can optionally include wherein the operations further comprise detecting whether the draft content includes offensive content; and in response to detecting offensive content, triggering the content generator to generate alternative draft content.

In example 17, the subject matter of any of examples 13-16 can optionally include wherein the operations further comprise training the one or more machine learning models with labeled data encompassing a range of genre, topics, and writing styles, the labeled data being obtained in part from documents generated by a coupled cloud-based system.

In example 18, the subject matter of any of examples 13-17 can optionally include wherein the first ML model and the second ML model are the same ML model.

In example 19, the subject matter of any of examples 13-18 can optionally include wherein the operations further comprise receiving, by the editor system via the editor user interface component displayed on the client device, an indication of one or more customization selections for customizing the draft content.

Example 20 is a storage medium comprising instructions which, when executed by one or more hardware processors of a machine, cause the machine to perform operations for automatically generating content that is contextually relevant in the writing style of a user. The operations comprise receiving, by an editor system via an editor user interface component displayed on a client device of a user, a plurality of logical inputs regarding a topic in bullet point format; in response to receiving the plurality of logical inputs, generating, by a content generator of the editor system, draft content using one or more machine learning (ML) models, the generating comprising identifying a writing style of the user from a plurality of machine-learned writing styles by applying the plurality of logical inputs to a first ML model of the one or more ML models; determining a context and direction for the draft content by applying the plurality of logical inputs to a second ML model of the one or more ML models; and based on the plurality of logical inputs, the identified writing style, and the context and direction, generating at least one paragraph of draft content in the writing style of the user that follows an outline associated with the bullet point format and comprises a same context and direction as the plurality of logical inputs; and causing presentation of the draft content in the editor user interface component.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
   receiving, by an editor system via an editor user interface component displayed on a client device of a user, a signal containing a plurality of logical inputs regarding a topic and an indication of one or more customization selections for customizing draft content that will be generated based on the plurality of logical inputs, the signal generated based on entry of the plurality of logical inputs in a bullet point format in an input portion of the editor user interface component and based on one or more selections made via customization fields, or options displayed relative to the input portion on the editor user interface component;
   in response to receiving the signal containing the plurality of logical inputs and the indication of the one or more customization selections, triggering a content generator of the editor system to generate the draft content using one or more machine learning (ML) models, the generating comprising:
      applying the plurality of logical inputs to a first ML model of the one or more ML models to identify a writing style of the user from a plurality of machine-learned writing styles;
      applying the plurality of logical inputs to a second ML model of the one or more ML models to determine a context and direction for the draft content; and
      based on the plurality of logical inputs, the indication of the one or more customization selections, the identified writing style, and the context and direction, generating, by the content generator, at least one paragraph of draft content in the writing style of the user that follows an outline associated with the bullet point format and comprises a same context and direction as the plurality of logical inputs; and
   causing presentation of the draft content in the editor user interface component.

2. The method of claim 1, wherein the logical inputs comprise one or more sentences that provide the context and direction on the topic.

3. The method of claim 1, wherein the generating the draft content further comprises:
   performing a search for additional relevant information based on the plurality of logical inputs;
   extracting relevant data from results of the search, the extracted relevant data including relevant definitions, facts, entities, or concepts; and
   incorporating at least some of the extracted relevant data in the draft content.

4. The method of claim 3, wherein the extracting relevant data from the results of the search comprises using a third ML model trained to identify relevant information.

5. The method of claim 1, further comprising:
   performing a similarity check on the draft content;
   detecting that a portion of the draft content is within a similarity threshold of a portion of prior published content; and
   in response to the detecting, providing a citation to the portion of the prior published content in the draft content.

6. The method of claim 1, further comprising:
   detecting whether the draft content includes offensive content; and
   in response to detecting offensive content, triggering the content generator to generate alternative draft content.

7. The method of claim 1, further comprising:
   analyzing the draft content for spelling and grammar issues; and
   providing an indication of any detected spelling and grammar issues.

8. The method of claim 1, wherein the causing presentation of the draft content comprises causing presentation of an option to add the draft content to a document that the user is drafting.

9. The method of claim 1, further comprising:
   training the one or more machine learning models with labeled data encompassing a range of genre, topics, and writing styles, the labeled data being obtained in part from documents generated by a coupled cloud-based system.

10. The method of claim 1, wherein the first ML model and the second ML model are the same ML model.

11. The method of claim 1, wherein the editor user interface component is displayed as a popup window positioned over a document being drafted by the user in response to a selection of an editor option.

12. The method of claim 1, wherein the indication of the one or more customization selections comprises one or more of:
   an indication of a document type entered in a document type field;
   an indication of a length for the draft content entered in an output length field;
   an indication of whether additional relevant information can be automatically added based on an add information toggle; or
   an indication of whether inline citations can be automatically added based on a citation toggle.

13. A system comprising:
   one or more hardware processors; and a memory storing instructions that, when executed by the one or more hardware processors, cause the one or more hardware processors to perform operations comprising:

receiving, by an editor system via an editor user interface component displayed on a client device of a user, a signal containing a plurality of logical inputs regarding a topic and an indication of one or more customization selections for customizing draft content that will be generated based on the plurality of logical inputs, the signal generated based on entry of the plurality of logical inputs in a bullet point format in an input portion of the editor user interface component and based on one or more selections made via customization fields or options displayed relative to the input portion on the editor user interface component;

in response to receiving the signal containing the plurality of logical inputs and the indication of the one or more customization selections, trigerring a content generator of the editor system to generate the draft content using one or more machine learning (ML) models, the generating comprising:

applying the plurality of logical inputs to a first ML model of the one or more ML models to identify a writing style of the user from a plurality of machine-learned writing styles;

applying the plurality of logical inputs to a second ML model of the one or more ML models to determine a context and direction for the draft content; and based on the plurality of logical inputs, the indication of the one or more customization selections, the identified writing style, and the context and direction, generating, by the content generator, at least one paragraph of draft content in the writing style of the user that follows an outline associated with the bullet point format and comprises a same context and direction as the plurality of logical inputs; and causing presentation of the draft content in the editor user interface component.

14. The system of claim 13, wherein the generating the draft content further comprises:

performing a search for additional relevant information based on the plurality of logical inputs;

extracting relevant data from results of the search, the extracted relevant data including relevant definitions, facts, entities, or concepts; and incorporating at least some of the extracted relevant data in the draft content.

15. The system of claim 13, wherein the operations further comprise:

performing a similarity check on the draft content;

detecting that a portion of the draft content is within a similarity threshold of a portion of prior published content; and in response to the detecting, providing a citation to the portion of the prior published content in the draft content.

16. The system of claim 13, wherein the operations further comprise:

detecting whether the draft content includes offensive content; and in response to detecting offensive content, triggering the content generator to generate alternative draft content.

17. The system of claim 13, wherein the operations further comprise:

training the one or more machine learning models with labeled data encompassing a range of genre, topics, and writing styles, the labeled data being obtained in part from documents generated by a coupled cloud-based system.

18. The system of claim 13, wherein the first ML model and the second ML model are the same ML model.

19. The system of claim 13, wherein the editor user interface component comprises an input portion for input of the plurality of logical inputs and a portion comprising a plurality of customization options from which selection of the one or more customization selections for customizing the draft content is received.

20. A storage medium comprising instructions which, when executed by one or more hardware processors of a machine, cause the machine to perform operations comprising:

receiving, by an editor system via an editor user interface component displayed on a client device of a user, a signal containing a plurality of logical inputs regarding a topic and an indication of one or more customization selections for customizing draft content that will be generated based on the plurality of logical inputs, the signal generated based on entry of the plurality of logical inputs in a bullet point format in an input portion of the editor user interface component and based on one or more selections made via customization fields or options displayed relative to the input portion on the editor user interface component;

in response to receiving the signal containing the plurality of logical inputs and the indication of the one or more customization selections, triggering a content generator of the editor system to generate the draft content using one or more machine learning (ML) models, the generating comprising:

applying the plurality of logical inputs to a first ML model of the one or more ML models to identify a writing style of the user from a plurality of machine-learned writing styles;

applying the plurality of logical inputs to a second ML model of the one or more ML models to determine a context and direction for the draft content; and based on the plurality of logical inputs, the indication of the one or more customization selections, the identified writing style, and the content in the writing style of the user that follows an outline associated with the bullet point format and comprises a same context and direction as the plurality of logical inputs; and causing presentation of the draft content in the editor user interface component.

* * * * *